C. E. McFADDEN.
FUMIGATING APPARATUS.
APPLICATION FILED MAY 28, 1908.
916,762.
Patented Mar. 30, 1909.
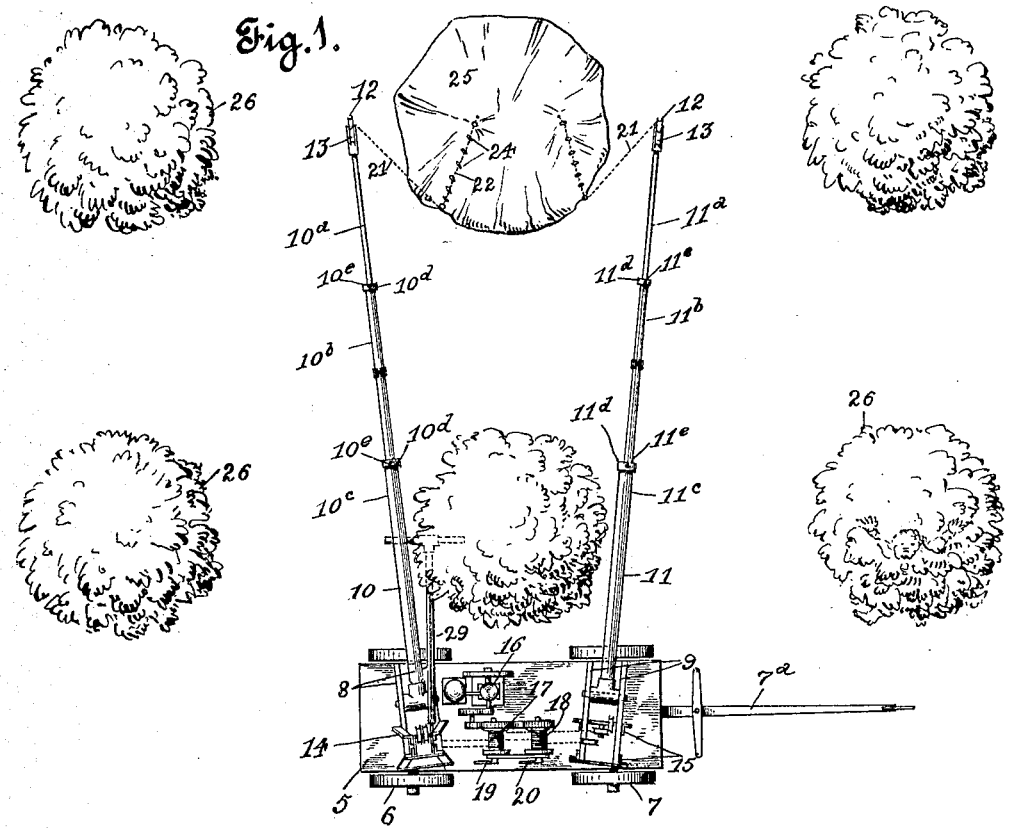
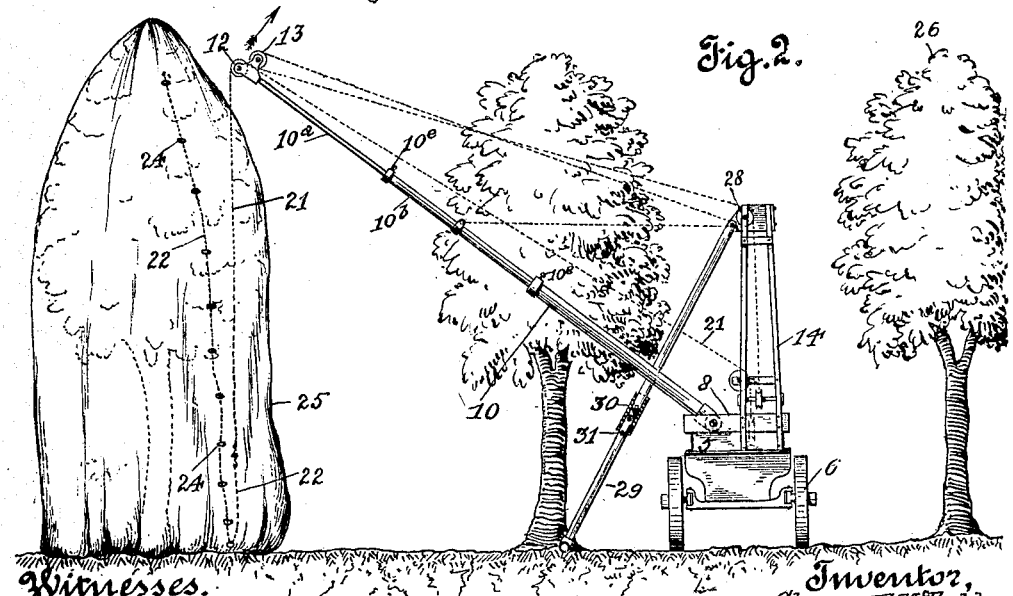

UNITED STATES PATENT OFFICE.

CLARENCE E. McFADDEN, OF NEAR FULLERTON, CALIFORNIA.

FUMIGATING APPARATUS.

No. 916,762.    Specification of Letters Patent.    Patented March 30, 1909.

Application filed May 28, 1908. Serial No. 435,579.

*To all whom it may concern:*

Be it known that I, CLARENCE E. MCFADDEN, a citizen of the United States, residing near Fullerton, in the county of Orange and State of California, have invented new and useful Improvements in Fumigating Apparatus, of which the following is a specification.

In fumigating citrus fruit trees, in California and elsewhere it is the custom to cover the tree with a sheet of canvas which folds around and over the tree and forms a tent within which the materials used in forming the fumigating gas, usually cyanid of potassium, sulfuric acid and water, all contained in a vessel, are placed. This treatment is applied at night and the pieces of canvas or tents have heretofore been moved by means of poles operated by men. Where the trees are large the canvas to cover the same is quite heavy and the poles to place the same over the trees are likewise long and heavy and the whole apparatus is awkward and difficult to manage and it requires considerable time to place the same over a tree and to remove it therefrom.

It is the object of my invention to provide a simple and efficient machine that can be quickly adjusted for use with different sized trees so that the same can be used with trees with a maximum height equally with those of a minimum height, and which will enable the handling of the canvas covering of the trees with fewer operatives and less labor and in a more expeditious manner than can be done at the present time. I accomplish these objects by the mechanism described herein and illustrated in the accompanying drawings, in which:

Figure 1 is a plan of my machine showing it in position ready to remove a canvas covering or tent from one tree and place it upon another. Fig. 2 is an end elevation of the machine ready to remove a tent.

In the drawings 5 is the body or bed of the machine which is supported by the hind trucks 6 and front trucks 7, which trucks are constructed, and guided like the front truck of an automobile. To the front end of the body is secured a tongue $7^a$ which forms means for securing a span of horses or other draft animals to the machine for moving the same from position to position. The parts thus described may be termed a wagon. At each end of the bed and on the top thereof are boom frames 8 and 9, in which are pivotally mounted the sectional booms 10 and 11. These booms are preferably made of pipe of different sizes, the outer sections $10^a$ and $11^a$ being the smallest in size and telescoping in sections $10^b$ and $11^b$, and said last sections telescoping into sections $10^c$ and $11^c$ when it is desired to shorten the booms for use on trees of medium or short height. Collars $10^d$ and $11^d$ and set screws $10^e$ and $11^e$ provide means for such adjustment. When the booms are fully extended as shown in the drawings they are adapted for use with trees of the largest size. On the outer ends of the booms are mounted the tent sheaves 12 and the boom sheaves 13. At each end of the bed and at one side thereof are boom towers or frames 14 and 15, boom tower 15 in Fig. 1 being partly removed for clearness of illustration.

Mounted upon the bed near the center thereof is a gas engine 16, or other suitable motive power which is adapted to drive the rope drums 17 and 18 in the same direction and at the same time if desired. These drums are provided with the usual friction gearing operated by levers 19 and 20 so that the drums can be revolved together or separately or not revolved as desired, when the engine is in motion. The boom towers are provided at the bottom and top with direction changing pulleys around which pass ropes for operating the tents and booms. It is immaterial which rope drum is used for the tents and which for the booms. If the rope drum 17 is used as a tent operating drum, tent-lifting rope 21 would pass from the drum around the direction changing pulleys at the base of tower 14, and thence over the tent sheave 12, and would then be connected to tent rope 22. The tent rope 22 passes through a succession of rings 24 which are secured to the tent 25. These rings extend in two rows from points easily reached by the operator when standing on the ground and distant apart not quite the horizontal distance through the limbs of the tree at such point, to points not quite so far apart and which will be at a short distance below the top of the tree when the tent is in place thereon. The tent ropes are secured to the tent near the upper ring when the tent is positioned for use as shown in the upper drawings. These rings and tent ropes are arranged for the largest sized trees with which the tent is used, for small trees small tents are preferred.

In the operation of my device canvas suitable for covering the tree would be spread out upon the ground beyond the tree and the machine would be brought to a position at one side of the tree as shown in Fig. 1. The booms would then be lowered so that the tent ropes could be attached to the tent-lifting ropes when the booms would be elevated so as to carry the tent up into contact with the tree and bring the attached side thereof over the side of the tree next to the machine, when the tent-lifting ropes would be permitted to unwind and allow the tent to drop down over the tree when the rope would be unhooked from the tent rope and the machine would be moved to the next tree, when the next tent would be put over the tree in like manner. In Fig. 1 I have shown trees 26 arranged in two rows as representing a part of an orchard, and in the operation just described that row at the top of the figure would be the first row and the machine would be between the first and second row in placing the tents upon the first row. In Fig. 1 only one tent is shown as being in place upon a tree, and the machine is shown in position for removing such tent to a tree in the second row. This operation is accomplished by placing the machine as shown in Fig. 1 of the drawings and securing the tent-lifting ropes to the tent ropes as best shown in Fig. 2. The boom ropes are then wound to elevate the boom, and as shown in Fig. 2 one end is secured to the middle section when operating on large trees, but which can be shifted to other sections when operating on smaller trees. The boom rope then passes around direction changing pulley 28 at the top of the tower, thence around sheave 13 at the end of the boom, thence to another direction changing pulley at the top of the tower and down over direction changing pulleys at the bottom of the tower and is then secured to the drum.

The boom ropes are both secured to the same drum so that both booms have a uniform movement either up or down as the ropes are wound on or unwound from the drum. The tent-lifting ropes are both secured to the other drum. After attaching the tent lifting ropes to the tent ropes the free ends of the booms would be elevated to a height a little above the tops of the trees. The tent-lifting ropes secured to the tent ropes would then be operated to raise that side of the tent next to the machine above the tops of the trees. The free ends of the booms would then be elevated so as to pull the tent off the first tree and after it swung clear of such tree it would be passed up against the next tree being lowered in the meantime by the tent-lifting ropes if necessary, sufficiently to engage the far side of the tree from the machine, and after the tent had engaged such tree it would be lowered at the same time that the center thereof was being brought over the center of the tree and when the near side of the tent was brought far enough over the center of the tree to drop down upon that side of the tree next to the machine the tent-lifting ropes would be unwound to allow that side of the tent to drop to the ground. The tent-lifting ropes would be unhooked from the tent ropes and the machine would be moved to the next tree of that row when the booms would be lowered to remove the tent from the tree in the first row and place it over the tree next to it in the second row. Thereafter the operation would be repeated until the tents were all moved onto the second row. After the second row was fumigated the machine would be moved between the third and fourth rows of trees when the tents would be moved in like manner from the trees in the second row and placed upon the trees in the third row. This operation would be repeated until all the trees in the orchard were fumigated.

In some cases where the trees are very large the booms are so long and heavy that there is danger of the machine tipping. In such cases I provide a jointed steadying brace 29 having one end thereof secured pivotally to the top of the tower and having a joint covered with a sliding sleeve 30 shown in section in Fig. 2 to slide down over the joint to make the brace rigid when the machine is in use. A stop pin 31 limits the downward movement of the sleeve. This brace is of a sufficient length so that when the free end thereof engages the ground it will be at a distance from the trucks as shown in Fig. 2 and thereby brace the tower against tipping. I have shown only one brace but each tower may be braced if desired. When moving the machine from tree to tree the sleeve can be moved above the joint and the lower part folded upon the upper and both swung into the bed of the machine and secured thereto in any suitable manner.

Having described my invention what I claim is:

1. A wagon; booms secured to the bed thereof at each end of said bed; means to operate said booms in unison in substantially parallel relation to each other; sheaves upon the ends of said booms; tent-lifting ropes passing through said sheaves; and means to operate said tent-lifting ropes.

2. A fumigating apparatus comprising a wagon; booms secured to the bed thereof at the ends of said bed; means to operate said booms; sheaves upon the ends of said booms; tent-lifting ropes passing through said sheaves; means to operate said tent-lifting ropes in combination with canvas tents said tent lifting ropes being secured to said tent.

3. In a fumigating apparatus, a sheet of canvas having two rows of rings secured thereto upon one side of the same; and ropes passing through said rings and having the ends thereof secured to the canvas near the center thereof.

4. A fumigating apparatus comprising a wagon; booms comprising telescopic sections pivotally secured to the bed thereof, there being a boom at each end of the wagon; means to operate said booms; sheaves upon the ends of said booms; tent-lifting ropes passing through said sheaves; means to operate said tent-lifting ropes; in combination with canvas tents having secured thereto said tent lifting ropes.

In witness that I claim the foregoing I have hereunto subscribed my name this 22 day of May, 1908.

CLARENCE E. McFADDEN.

Witnesses:
G. E. HARPHAM,
S. B. AUSTIN.